(12) United States Patent
Ganesh et al.

(10) Patent No.: US 10,726,038 B2
(45) Date of Patent: Jul. 28, 2020

(54) SYSTEM AND METHOD FOR OPTIMIZING AGGREGATION AND ANALYSIS OF DATA ACROSS MULTIPLE DATA SOURCES

(71) Applicant: Mphasis Limited, Mahadevapura, Bangalore (IN)

(72) Inventors: Jai Ganesh, Bangalore (IN); Damini Gupta, Delhi (IN); Ashutosh Vyas, Jaipur (IN); Meer Ahmed, Tiruchirappalli (IN); Ravi Sahu, Delhi (IN); Rajdeep Sharma, Jaipur (IN); Ankit Mishra, Indore (IN); Saurabh Singh, Kanpur (IN); Divay Garg, Saharanpur (IN)

(73) Assignee: Mphasis Limited (IN)

( * ) Notice: Subject to any disclaimer, the term of this patent is extended or adjusted under 35 U.S.C. 154(b) by 267 days.

(21) Appl. No.: 15/987,373

(22) Filed: May 23, 2018

(65) Prior Publication Data
US 2018/0341688 A1 Nov. 29, 2018

(30) Foreign Application Priority Data
May 24, 2017 (IN) .............................. 201741018279

(51) Int. Cl.
*G06F 16/25* (2019.01)
*G06F 16/2458* (2019.01)
*G06Q 30/02* (2012.01)
*G06Q 10/06* (2012.01)

(52) U.S. Cl.
CPC ........ *G06F 16/254* (2019.01); *G06F 16/2465* (2019.01); *G06Q 10/063* (2013.01); *G06Q 30/0201* (2013.01)

(58) Field of Classification Search
USPC ........................................................ 707/602
See application file for complete search history.

(56) References Cited

U.S. PATENT DOCUMENTS

| | | | | |
|---|---|---|---|---|
| 7,062,500 B1* | 6/2006 | Hall | ........................ | G06F 21/10 |
| 7,853,546 B2* | 12/2010 | Damodharan | ...... | G06F 11/2257 |
| | | | | 706/47 |
| 8,204,128 B2* | 6/2012 | Huchet | ................ | H04N 19/176 |
| | | | | 375/240.18 |
| 8,370,352 B2* | 2/2013 | Lita | ........................ | G16H 10/60 |
| | | | | 707/736 |
| 9,084,937 B2* | 7/2015 | Gadher | ................ | G06F 11/008 |

(Continued)

*Primary Examiner* — Cam Linh T Nguyen
(74) *Attorney, Agent, or Firm* — Lerner, David, Littenberg, Krumholz & Mentlik, LLP

(57) ABSTRACT

A system and method for optimizing aggregation and analysis of data across multiple data sources of multiple enterprises is provided. Data extraction rules are generated by invoking an automatic rule generation rule. Automatic rule generation rule is invoked if a predefined set of rules is not applicable for extracting data. Further, data adaptation rules is generated if data extracted by applying data extraction rules and a predefined set of rules does not correspond to a predetermined output. The data adaptation rules is encapsulated in a feedback loop for transmitting to the data acquisition unit. Data optimization rules s generated based on data extraction rules and data adaptation rules. One or more metrics is generated based on data optimization rules. The metrics specify characteristics relevant to one or more enterprises.

25 Claims, 3 Drawing Sheets

(56) References Cited

U.S. PATENT DOCUMENTS

| | | | | |
|---|---|---|---|---|
| 10,122,762 B2* | 11/2018 | Chesla | ............... | H04L 63/1441 |
| 10,296,850 B2* | 5/2019 | Aliferis | ................. | G06Q 10/00 |
| 10,303,737 B2* | 5/2019 | Statnikov | ............... | G06F 17/18 |
| 2007/0233629 A1* | 10/2007 | Balog | ............ | G01R 31/318314 |
| | | | | 706/47 |
| 2008/0222070 A1* | 9/2008 | Damodharan | ...... | G06F 11/2257 |
| | | | | 706/47 |
| 2011/0196821 A1* | 8/2011 | Hellerman | ............ | G06F 16/958 |
| | | | | 707/600 |
| 2013/0304742 A1* | 11/2013 | Roman | ................ | G06F 16/285 |
| | | | | 707/740 |

\* cited by examiner

SYSTEM AND METHOD FOR OPTIMIZING AGGREGATION AND ANALYSIS OF DATA ACROSS MULTIPLE DATA SOURCES

FIELD OF THE INVENTION

The present invention relates generally to the field of data mining and analysis for decision making, and more particularly, to a system and method for optimizing aggregation and analysis of data across multiple data sources for intelligent decision making.

BACKGROUND OF THE INVENTION

Challenges in the area of enterprise decision making is ever growing, and more so, on account of exponential growth in enterprise data and external sources. Monitoring and mining from various enterprise data sources presents challenges in view of unstructured and structured content spread across these data sources. Examples of unstructured and structured content may include, but is not limited to, data from emails, call centre transcripts, policy documents, broker submissions, bank statements, customer complaints, and loss run documents. Generating valuable insights from these data sources is increasingly being recognized as a necessity for enterprise decision making. As such, data and information retrieval, extraction, aggregation, and analysis has become a humungous and complex task. Yet further, there is an increasing demand for right data metrics catering to the requirements of enterprises which would influence strategy, products, and services of those enterprises.

In light of the above drawbacks, there is a need for a system and method that optimizes data aggregation and analytics across physical and digital data sources. Also, there is a need for a system and method that provides comprehensive, accurate, real-time and actionable insights across a plurality of enterprise data points spread over multiple physical and digital data sources.

SUMMARY OF THE INVENTION

A system for optimizing aggregation and analysis of data across multiple data sources of multiple enterprises. The system comprises a memory for storing program instructions and a processor for executing program instructions stored in the memory. The system further comprises a data acquisition unit in communication with the processor and configured to generate a first set of data extraction rules by invoking an automatic rule generation rule. The automatic rule generation rule is invoked in the event a predefined set of rules is determined to be not applicable for extracting data associated with the multiple data sources. Further, the system comprises a data analytics and feedback unit in communication with the processor and configured to generate a second set of data adaptation rules in the event data extracted by applying at least one of: the first set of data extraction rules and the predefined set of rules does not correspond to a predetermined output. The set of data adaptation rules specifies a particular way of adapting one or more rules from the first set of data extraction rules and/or one or more rules of the predefined set of rules. The data analytics and feedback unit encapsulates the second set of data adaptation rules in a feedback loop for transmitting to the data acquisition unit. The system further comprises an automatic decision making unit in communication with the processor and configured to generate a set of data optimization rules based on the first set of data extraction rules and the second set of data adaptation rules. The set of data optimization rules is generated by associating each data extraction rule from the first set of data extraction rules and the predefined set of rules with a corresponding data adaptation rule. The automatic decision making unit further generates one or more metrics based on the set of data optimization rules. The one or more metrics specify characteristics relevant to one or more enterprises.

A method for optimizing aggregation and analysis of data across multiple data sources of multiple enterprises is provided. The method comprises generating a first set of data extraction rules by invoking an automatic rule generation rule. The automatic rule generation rule is invoked in the event a predefined set of rules is determined to be not applicable for extracting data associated with the multiple data sources. Further, the method comprises generating a second set of data adaptation rules in the event data extracted by applying at least one of: the first set of data extraction rules and the predefined set of rules does not correspond to a predetermined output. The set of data adaptation rules specifies a particular way of adapting one or more rules from the first of data extraction rules and/or one or more rules of the predefined set of rules. Further, the method comprises encapsulating the second set of data adaptation rules in a feedback loop for transmission. Furthermore, the method comprises generating a set of data optimization rules based on the first set of data extraction rules and the second set of data adaptation rules. The set of data optimization rules is generated by associating each data extraction rule from the set of data extraction rule and the predefined set of rules with a corresponding data adaptation rule. Finally, the method comprises generating one or more metrics based on the set of data optimization rules. The one or more metrics specify characteristics relevant to one or more enterprises.

A computer program product comprising a non-transitory computer-readable medium is provided. The computer-readable medium has computer-readable program code stored thereon, the computer-readable program code comprises instructions that, when executed by a processor, causes the processor to generate a first set of data extraction rules by invoking an automatic rule generation rule, wherein the automatic rule generation rule is invoked in the event a predefined set of rules is determined to be not applicable for extracting data associated with the multiple data sources. Further, the processor generates a second set of data adaptation rules in the event data extracted by applying at least one of: the first set of data extraction rules and the predefined set of rules does not correspond to a predetermined output, wherein the set of data adaptation rules specifies a particular way of adapting one or more rules from the first set of data extraction rules and/or one or more rules of the predefined set of rules, and encapsulate the second set of data adaptation rules in a feedback loop for transmitting to the data acquisition unit. Furthermore, the processor generates a set of data optimization rules based on the first set of data extraction rules and the second set of data adaptation rules, wherein the set of data optimization rules is generated by associating each data extraction rule from the first set of data extraction rules and the predefined set of rules with a corresponding data adaptation rule, and generate one or more metrics based on the set of data optimization rules, wherein the one or more metrics specify characteristics relevant to one or more enterprises.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for optimized data aggregation and analytics across physical and digital data sources is provided. The invention provides for a tool for enterprises to engage at real-time with enterprise data sources and optimizes enterprise decision makers by providing the enterprises with the right data metrics that would influence their strategy, products, services, and brand. The invention provides for tapping accumulated content over myriad data sources through the relevant analyses. The invention provides for automatically generating rules and employing artificial intelligence and advanced analytics to extract, adopt, exploit and analyse data as against using conventional techniques such as brute force. The invention provides for an intelligent tool that is configured with the capability of automatically generating rules that optimize the process of data extraction and adaptation.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
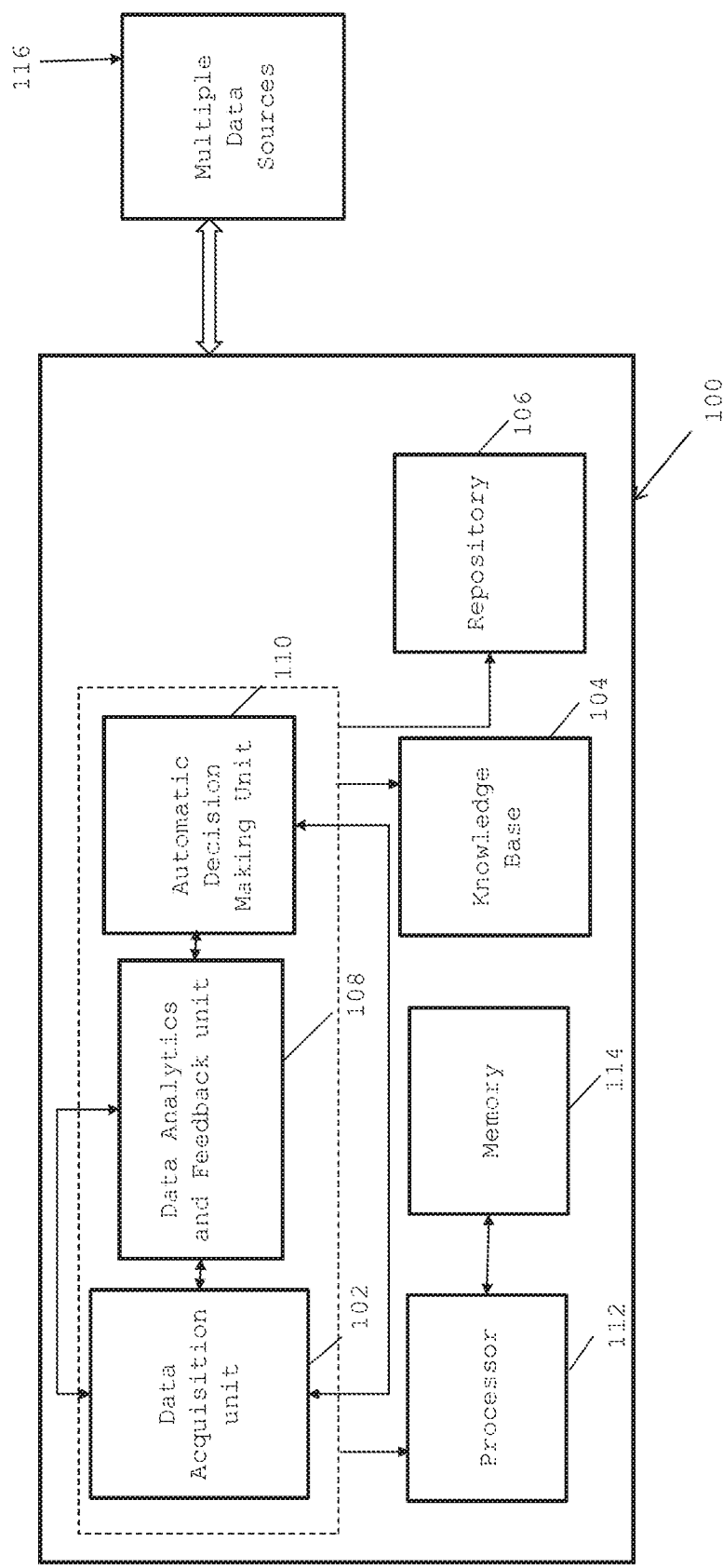
FIG. 1 illustrates a block diagram of a system for optimizing aggregation and analysis of data across multiple data sources, in accordance with various embodiments of the present invention.

FIG. 1 illustrates a block diagram of a system 100 for optimizing aggregation and analysis of data across multiple data sources.

In accordance with various embodiments of the present invention, the system 100 is a cognitive computing platform. The system 100 is configured to engage with multiple enterprises at real-time through functionalities such as monitor, extract, ingest, analyse, reason via various components of the system 100. The system 100 is an intelligent device that is configured with the capability of automatically generating rules that optimize the process of data extraction and adaptation. In an embodiment of the present invention, the system 100 is a self-enabled tool which automatically generates a set of optimization rules. The automatically generated set of optimization rules includes a subset of rules generated based on, historical data, captured data, and corrected data. The system comprises a data acquisition unit 102, a knowledge base 104, a repository 106, a data analytics and feedback unit 108, and an automatic decision making unit 110. In various embodiments of the present invention, the data acquisition unit 102, the knowledge base 104, the repository 106, the data analytics and feedback unit 108 and the automatic decision making unit 110 operate in conjunction with a processor 112 which executes instructions stored in a memory 114.

In an embodiment of the present invention, the data acquisition unit 102 is configured to monitor and extract data from multiple data sources 116. Examples of the multiple data sources 116 include, but is not limited to, databases, images, documents, PDF documents, emails and web pages, social networking sites, application logs, machine logs, incident tickets, project reports, service desk complaints and chat scripts. The data in the multiple data sources 116 may include content from transactions data, emails, call centre transcripts, policy documents, broker submissions, bank statements, customer complaints, loss run documents, annual reports, tax returns, marketing reports, discussion threads, logs of chat room conversations, contents of blogs etc. The data in the multiple data sources 116 are stored in different formats. Various examples of multiple data formats, include, but is not limited to PDF, HTML, MSWord, CSV, and various database formats. The data acquisition unit 102 is triggered by a set of predefined rules stored in the knowledge base 104 to monitor and extract data stored in the multiple data sources 116. The pre-defined rules are generated based on inferences drawn from empirical data collected from different enterprises. The set of predefined rules also includes a rule to automatically generate new rules (automatic rule generation rule) if any of the set of predefined rules is not applicable on the monitored data.

Based on the information obtained from monitoring the multiple data sources 116, the data acquisition unit 102 is configured to retrieve data from one or more data sources of the multiple data sources 116 that correspond to particular enterprises and store the retrieved data in a repository 106. The data acquisition unit 102 then reads the retrieved data to identify the data format and convert the identified data format into a predetermined format. In an embodiment of the present invention, the data acquisition unit 102 is configured to read multiple data formats in documents, including, but is not limited to, physical documents, scanned documents, digital documents. The multiple data formats include, but is not limited to, PDF, images, HTML and various other formats using the set of predefined rules. In an exemplary embodiment of the present invention, the data acquisition unit 102 reads the identified data from physical, scanned or digital documents of different formats using optical character recognition software based on the set of predefined rules. The data acquisition unit 102 then reads and converts such data to a machine readable format for further processing. Further, the data acquisition unit 102 interprets the content of the converted documents and based on such interpretation, extracts relevant data.

In various exemplary embodiments of the present invention, the data acquisition unit 102 applies various cognitive computing techniques to extract the data based on the set of predefined rules. For instance, the data acquisition unit 102 selects one or more cognitive computing techniques including, but is not limited to, machine learning techniques, pattern recognition techniques, natural language processing techniques, graph theory and deep learning techniques based on a keyword match search and semantic data stored in the knowledge base 104. The knowledge base 104 is a source of reference and the semantic data stored in the knowledge base 104 is used for accurate extraction of relevant data from the converted documents. The knowledge base 104 is a customizable database and is updated from time-to-time such that the semantic data is updated and modified with data related to dynamic changes in various enterprise data, and the processed outcome from the data acquisition unit 102. In one example, natural language processing (NLP) based algorithms may be selected to comprehend and reason free text and numerical values from the converted documents based on semantic data that is pre-stored in the knowledge base 104. In another example, machine learning and text mining may be used to extract tabular information from PDF documents converted to HTML format using key-value pair. In yet another example, machine learning and text mining may be used to extract natural language associated information such as tables and sentences from PDF documents converted to MSWord documents.

In an exemplary embodiment of the present invention, the data acquisition unit 102 is configured to ascertain a specific rule from the set of predefined rules that is applicable on a specific data format to extract data. The specific rule corresponding to the specific data format is predefined based on the inferences drawn from empirical study of data formats of data stored in data sources of various enterprises. In the event, the data acquisition unit 102 ascertains that none of the rules from the set of predefined rules is applicable on the retrieved data from a specific data source of the multiple data sources 116, the rule generation rule is invoked. Using the rule generation rule, the data acquisition unit 102 learns the format of the data of that specific data source and generates a first set of rules, referred to as data extraction rules hereinafter. The data extraction rules is a subset rule of the set of optimization rules. The data extraction rules include different rules generated by learning different formats of data and each rule specifies a particular way of extracting the data.

Further, in particular, in an exemplary embodiment of the present invention, there may be multiple ways in which information is presented in the documents of multiple data formats. For instance, the information may be presented in the document as, but is not limited to, free text (e.g. annual report documents), key-value pair (e.g. claim insurance form documents), table (invoice documents) etc. Based on the specific data format and the manner in which information is presented in the documents, the data acquisition unit 102 may apply specific rules from the predefined set of rules to select and apply one or more techniques to read and extract data. In the event, none of the rules from the set of predefined rules is applicable, the data acquisition unit 102 invokes the automatic rule generation rule from the predefined set of rules to learn the data format and/or the manner in which information is presented and generate a rule to select and apply an appropriate technique for extracting data. The generated rule forms a part of the data extraction rules, which is a subset rule of the set of optimization rules.

In one example, if the identified data format is digital PDF., the data acquisition unit 102 is configured to select a specific rule from the set of predefined rules for reading the digital PDF and extracting data from the digital PDF. In this exemplary embodiment of the present invention, since the data in a digital PDF. document is in a machine readable format, the specific rule from the set of predefined rules is directly applied on the digital PDF document for extracting data from the digital PDF document. The specific rule may include that if data is presented in free text in the digital PDF document then the data acquisition unit 102 selects a natural language processing technique and a text mining technique to identify relevant text in the digital PDF document. In this exemplary embodiment, the data acquisition unit 102 identifies a use case in the digital PDF. document that requires one or more machine learning techniques for extracting data. In the event the data acquisition unit 102 determines that none of the rules of the predefined set of rules is applicable for extracting data of the particular use case, the data acquisition unit 102 invokes the automatic rule generation rule to generate a rule to learn the data format of the use case in the digital PDF. document for applying an appropriate machine learning technique to extract the data associated with the particular use case. The generated rule forms a part of the data extraction rules, which is a subset rule of the set of optimization rules.

In another example, if the identified data is a scanned PDF., the data acquisition unit 102 is configured to select another specific rule from the set of predefined rules for reading the scanned PDF. and extracting data from the scanned PDF. In this exemplary embodiment of the present invention, if the data acquisition unit 102 determines that the document is an invoice document and data is presented in the form of a table, a specific rule from the set of predefined rules is applied to select a natural language processing technique to extract relevant data from the table. In the event, the data acquisition unit 102 determines that none of the rules of the predefined set of rules is applicable to extract any portion of the data form the tabular format, the automatic rule generation rule is invoked. Subsequently, the data acquisition unit 102 learns the particular format of the portion of data and generates a rule to select and apply a machine learning technique, such as, clustering, to read and extract the portion of data from the tabular format of the invoice document. This rule forms another part of the data extraction rules, which is a subset rule of the set of optimization rules.

In an example scenario of extracting and analysing documents such as annual reports, the data acquisition unit 102 identifies key fields related to board members, appointment of board members, fees payable to board members as well as carbon emissions from annual report of different countries, such as India, United States, United Kingdom, Germany, Canada and Australia that are to be extracted. The fields such as appointment of board members typically appear at multiple places in an annual report, which is usually more than 300 pages. Fields such as fees payable to board members could appear as part of free text as well as in the form of tables. Information related to carbon emissions could exist as part of free text in an annual report as well as part of a table. The data acquisition unit 102 reads through all the pages of the annual report in an automated manner and converts the annual report into an HTML or Word format. Based on the set of predefined rules stored in the knowledge base 104, the data acquisition unit 102 selects one or more cognitive computing techniques for extracting data from the annual report. For instance, the data acquisition unit 102 may select natural language processing techniques including, but not limited to, bag of words and text matching for identifying all sentences in the annual report, where the term board of director appears based on a keyword match search. Further, using the semantic data, the data acquisition unit 102 extracts relevant related matching words from the knowledge base 104. For instance, some countries refer to the board members as 'directors', 'board of directors', 'This board' or 'managing members' etc. The data acquisition unit 102 uses the keyword match and the semantic data to identify and extract all the related words so that all relevant sentences are captured. In the case of tables, for instance, carbon emissions could have data from the current year as well as the past year. Since data from the current year is required, none of the rules in the predefined set of rules may be applicable to identify, and the data acquisition unit 102 invokes the automatic rule generation rule. Subsequently, the data acquisition unit 102 learns the data format and generates a rule to extract data from the current year by selecting and applying machine learning techniques including spatial-temporal reasoning and pattern recognition algorithms.

In various embodiments of the present invention, the data acquisition unit 102 is capable of handling high volume of data effectively and efficiently. The extracted data may include various structured and unstructured data which is stored in the knowledge base 104 as semantics data. The extracted data may also include content from original sources which is created by the user. Further, the extracted data may include content from referenced sources which is material and cited and presented by users. The content may also include aggregated data which is a collection of content organized in a particular manner. The content therefore represents an aggregation of collective intelligence of an enterprise user community.

In an embodiment of the present invention, the data analytics and feedback unit 108 is configured to receive the extracted data from the data acquisition unit 102 and perform analysis of the extracted data. The data analytics and feedback unit 108 analyzes the extracted data from the documents and generates an output for validation. In various embodiments of the present invention, the data analytics unit 108 analyses the extracted data using various cognitive computing techniques. Cognitive computing technologies refer to the use of intelligent computing theories and methodologies that implement computational intelligence by autonomous inferences and perceptions mimicking mechanisms of the brain. Cognitive computing techniques include technologies and analytics techniques such as natural language processing, machine learning, adaptive and learning, algorithms, image analytics, graph theory, vision-based sensing and image recognition, spatial and contextual awareness, reasoning and decision automation, pattern recognition, neural networks, semantic knowledge, robotic decision making, emotional Intelligence etc. The data analytics and feedback unit 108 is configured to analyse data using various computing techniques and perform corrections on the generated output if the output does not correspond to a predetermined output. The predetermined output is based on a predefined criteria stored in the knowledge base 104. In an exemplary embodiment of the present invention, the pre-defined criteria is obtained by empirical study of various enterprise data and is stored in the knowledge base 104. The pre-defined criteria may be modified by making changes to the knowledge base 104. Additionally, the predefined criteria is generated based on historical data collected on the basis of data extracted using the data extraction rules. The corrected output is stored as feedback data in the repository 106. Based on the feedback data, the data analytics and feedback unit 108 generates a second set of rules, which is referred to as data adaptation rules. The data adaptation rules is a subset rule of the set of optimization rules. The data adaptation rules includes different rules generated based on corrected output of analysed extracted data of documents, and each rule specifies a particular way of adapting a corresponding rule of the first set of data extraction rules to adapt to documents which have a different way of presenting information. In another exemplary embodiment, data adaptation rules are also generated in the event the data extracted by applying any specific rule from the predefined set of rules does not correspond to a predetermined output to adapt the specific rule to documents with a different way of presenting information. The data analytics and feedback unit 108, therefore, generates rules (viz. data adaptation rules) which causes the system 102 to learn new ways in which information is presented in the same type of document and such information is incorporated as additional rules.

In an exemplary embodiment of the present invention, for example, the system 102 is operating on annual reports to extract auditor names from annual reports. At the data analysis stage, the data analysis and feedback unit 102 generates an output of the extracted data (performed by the data acquisition unit 102) for validation. In particular, in an exemplary embodiment of the present invention, the data analytics unit and feedback 108 creates a term document matrix to generate all possible permutations and combination of terms (data) in the extracted data. For example, the term document matrix may be generated with possible permutation and combination of various words used in various sentences that have been extracted. The data analytics and feedback unit 108 thereafter analyses the data in the context of the predefined criteria to generate one or more data elements. For instance, in this example, the data analytics and feedback unit 108 identifies the information presented in the free text format. Once it has identified the free text format, it applies natural language processing to first identify sentences that have auditor keyword. If the output, that is, the terms of the sentences does not correspond to a predetermined output i.e. auditor name is found to have not been extracted, the data acquisition and feedback unit 102 generates a rule to learn new terms (stored as data elements in the term document matrix) that correspond to the auditor name. The new rule forms a part of the second set of rules that is, the data adaptation rules. In this example, the new rule may include applying any other cognitive computing technique, such as, pattern recognition algorithms to extract terms from sentences that are contextually relevant based on the predefined criteria, and stores them in the term document matrix as data elements. For instance, terms such as controller which is a synonym for auditor may be stored in the term document matrix. The new rule, that is a part of the set of data adaptation rules, is encapsulated and transmitted in a feedback loop formed between the data acquisition unit 102 and the data analytics and feedback unit 108. Further, the data generated by application of the data adaptation rule is stored in the knowledge base 104 as semantics data. The feedback loop therefore provides for data generated by application of the data adaptation rules, which data forms a part of the semantic data and is used for processing similar documents by the data acquisition unit 102.

In an embodiment of the present invention, the automatic decision making unit 110 is configured to receive the set of data extraction rules and the set of data adaptation rules from the data acquisition unit 102 and the data analytics and feedback unit 108. The automatic decision making unit 110 then automatically generates a set of data optimization rules by processing the set of data extraction rules and the data adaptation rules. The data extraction rules and data adaptation rules are processed by the automatic decision making unit 110 to identify correspondence between each data extraction rule and each data adaptation rule. The data optimization rule is generated by associating one or more rules from the set of data extraction rules with a corresponding data adaptation rule. The generation of data optimization rule also includes associating one or more rules from the predefined set of rules with a corresponding data adaptation rule. A set of data optimization rules is generated and rendered in a specific sequence of data extraction rules and a corresponding data adaptation rules.

Based on the data optimization rules, the automatic decision unit 110 generates one or more metrics on the basis of the results of processing the data optimization rules. The one or more metrics specify characteristics relevant to particular enterprises. The one or more metrics may be saved as a CSV file for further reference by an enterprise. The automatic decision making unit 110 thereafter generates workflows on the basis of the generated metrics for each enterprise in relation to services and products offered by the enterprise. Therefore, the one or more metrics are used for influencing strategy, products and services of the enterprises.

In accordance with various embodiments of the present invention, the system 100 facilitates providing the appropriate enterprise data metrics that would effectively influence enterprise strategy, products, services, and brand. The system 100 is a tool that transforms enterprise decision making by providing most comprehensive, accurate, real-time and actionable insights across millions of enterprise data points spread over multiple physical and digital data sources. The system 100 incorporates in-depth domain expertise, is flexible, customizable and requires no upfront investments. Further, the system 100 provides flexible interaction by providing downstream processes through robotic process automation. The system 100 offers versatile interaction through virtual call and chat agents and provides for interaction with enterprise systems and channels such as virtual and human agents, databases as well as APIs across industries such as Wealth Advisory, Trade Finance, Insurance, and Banking.

Figure 2:
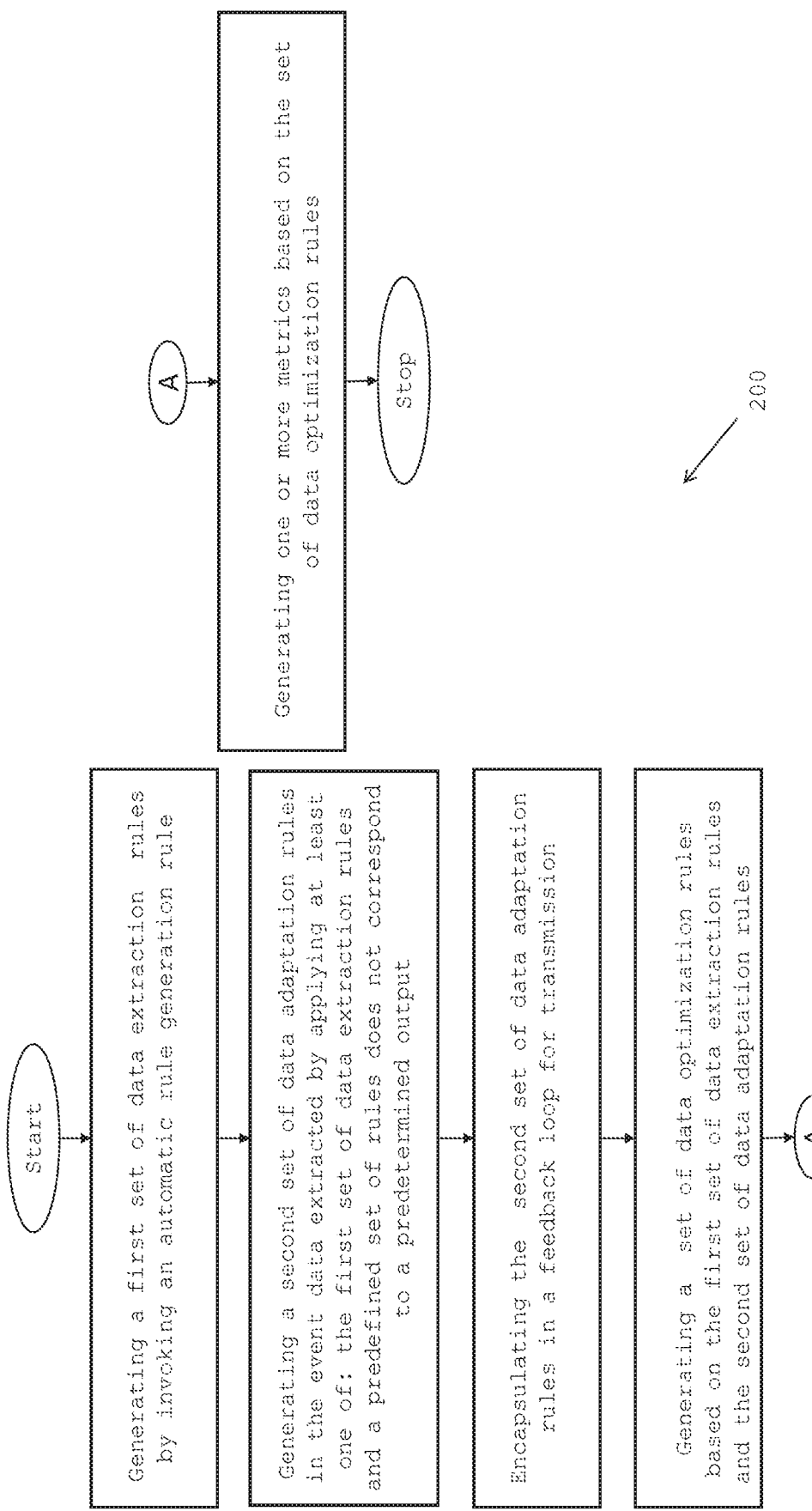
FIG. 2 is a flowchart illustrating a method for optimizing aggregation and analysis of data across multiple data sources, in accordance with various embodiments of the present invention.

FIG. 2 is a flowchart illustrating a method for optimizing aggregation and analysis of data across multiple data sources, in accordance with various embodiments of the present invention.

At step 202, a first set of data extraction rules is generated by invoking an automatic rule generation rule. In an embodiment of the present invention, data is monitored and extracted from multiple data sources of multiple enterprises using a set of predefined rules stored in a knowledge database. The pre-defined rules are generated based on inferences drawn from empirical data collected from different enterprises. The pre-defined rules include specific rules that are applicable on specific data formats to extract data. The set of predefined rules also includes a rule to automatically generate new rules (automatic rule generation rule) if any of the set of predefined rules is not applicable for extracting data. In the event, it is ascertained that none of the rules from the set of predefined rules is applicable on the retrieved data, in a document, from a specific data source of the multiple data sources, the automatic rule generation rule is invoked. Using the automatic rule generation rule, format of the data of that document is learnt and a first set of rules, referred to as data extraction rules is generated. The data extraction rules include different rules generated by learning different formats of data and each rule specifies a particular way of extracting data. In particular, the generated rule specifies an appropriate technique which is to be selected and applied for extracting the data. The technique may be selected from various cognitive computing techniques including, but not limited to, machine learning techniques, pattern recognition techniques, natural language processing techniques, graph theory and deep learning techniques based on a keyword match search and semantic data stored in the knowledge base.

At step 204, a second set of data adaptation rules is generated in the event data extracted by applying at least one of: the first set of data extraction rules and a predefined set of rules does not correspond to a predetermined output. In an embodiment of the present invention, the extracted data from the documents is analyzed and an output is generated for validation. The extracted data is analyzed using various cognitive computing techniques. Cognitive computing techniques include, but is not limited to, technologies and analytics techniques such as natural language processing, machine learning, adaptive and learning, algorithms, image analytics, graph theory, vision-based sensing and image recognition, spatial and contextual awareness, reasoning and decision automation, pattern recognition, neural networks, semantic knowledge, robotic decision making, emotional Intelligence etc. Using one or more of these techniques, the data is analyzed and corrections are performed on the generated output if the output does not correspond to a predetermined output. The predetermined output is based on a predefined criteria stored in the knowledge base. In an exemplary embodiment of the present invention, the predefined criteria is obtained by empirical study of various enterprise data and is stored in the knowledge base. The pre-defined criteria may be modified by making changes to the knowledge base. Additionally, the predefined criteria is generated based on historical data collected on the basis of data extracted using the data extraction rules. The corrected output is stored as feedback data in the repository. Based on the feedback data, a second set of rules is generated, which is referred to as data adaptation rules. The data adaptation rules includes different rules generated based on corrected output of analysed extracted data of documents, and each rule specifies a particular way of adapting a corresponding rule of the first set of data extraction rules to adapt to documents which have a different way of presenting information. In another exemplary embodiment, data adaptation rules are also generated in the event the data extracted by applying any specific rule from the predefined set of rules does not correspond to a predetermined output to adapt the specific rule to documents with a different way of presenting information. The data adaptation rules causes the system to learn new ways in which information is presented in the same type of document and such information is incorporated as additional rules. In particular, in an exemplary embodiment of the present invention, a term document matrix is generated with all possible permutations and combination of terms (data) in the extracted data. For example, the term document matrix may be generated with possible permutation and combination of various words used in various sentences that have been extracted. The data is analysed in the context of the predefined criteria to generate one or more data elements. A new rule is generated based on an analysis of the one or more data elements. The new rule forms a part of the second set of rules that is, the data adaptation rules.

At step 206, the second set of data adaptation rules is encapsulated in a feedback loop for transmission. In an embodiment of the present invention, the new rule, which is a part of the set of data adaptation rules, is encapsulated and transmitted in a feedback loop. Further, the data generated by application of the data adaptation rule is stored in the knowledge base as semantics data. The feedback loop therefore provides for data generated by application of the data adaptation rules, which data forms a part of the semantic data and is used for processing similar documents.

At step 208, a set of data optimization rules is generated based on the first set of data extraction rules and the second set of data adaptation rules. In an embodiment of the present invention, a set of data optimization rules is generated by processing the set of data extraction rules and the data adaptation rules. The data extraction rules and data adaptation rules are processed to identify correspondence between each data extraction rule and each data adaptation rule. The data optimization rule is generated by associating one or more rules from the set of data extraction rules with a corresponding data adaptation rule. The generation of data optimization rule also includes associating one or more rules from the predefined set of rules with a corresponding data adaptation rule. A set of data optimization rules is generated and rendered in a specific sequence of data extraction rules and a corresponding data adaptation rules.

At step 210, one or more metrics is generated based on the set of data optimization rules. In an embodiment of the present invention, one or more metrics is generated on the basis of the results of processing the data optimization rules. The one or more metrics specify characteristics relevant to particular enterprises. The one or more metrics may be saved as a CSV file for further reference by an enterprise. Using the one or more metrics, workflows may be generated for each enterprise in relation to services and products offered by the enterprise. Therefore, the one or more metrics are used for influencing strategy, products and services of the enterprises.

Figure 3:
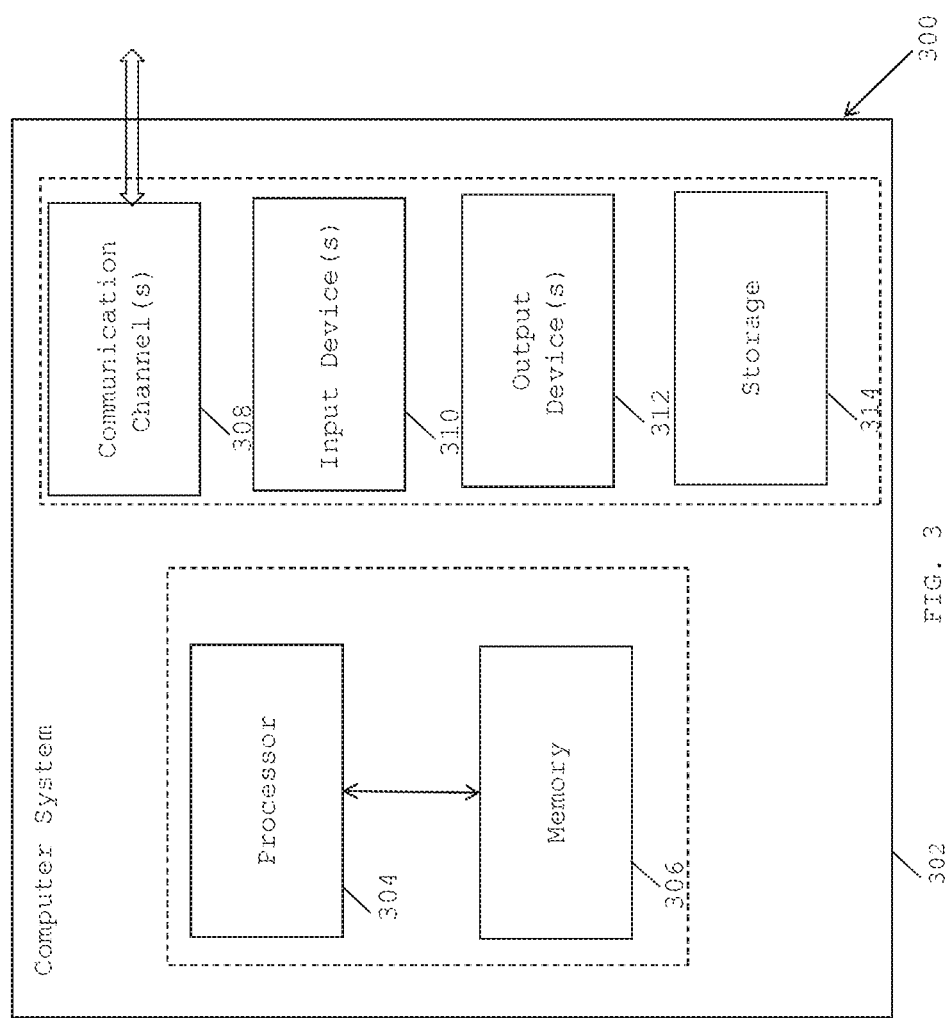
FIG. 3 illustrates an exemplary computer system in which various embodiments of the present invention may be implemented.

FIG. 3 illustrates an exemplary computer system in which various embodiments of the present invention may be implemented, in accordance with various embodiments of the present invention.

The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for optimizing aggregation and analysis of data across multiple data sources of multiple enterprises, the system comprising:
    a memory for storing program instructions;
    a processor for executing program instructions stored in the memory;
    a data acquisition unit in communication with the processor and configured to generate a first set of data extraction rules by invoking an automatic rule generation rule, wherein the automatic rule generation rule is invoked in the event a predefined set of rules is determined to be not applicable for extracting data associated with the multiple data sources;
    a data analytics and feedback unit in communication with the processor and configured to generate a second set of data adaptation rules in the event data extracted by applying at least one of: the first set of data extraction rules and the predefined set of rules does not correspond to a predetermined output, wherein the set of data adaptation rules specifies a particular way of adapting one or more rules from the first set of data extraction rules and/or one or more rules of the predefined set of rules, and encapsulate the second set of data adaptation rules in a feedback loop for transmitting to the data acquisition unit; and an automatic decision making unit in communication with the processor and configured to generate a set of data optimization rules based on the first set of data extraction rules and the second set of data adaptation rules, wherein the set of data optimization rules is generated by associating each data extraction rule from the first set of data extraction rules and the predefined set of rules with a corresponding data adaptation rule, and generate one or more metrics based on the set of data optimization rules, wherein the one or more metrics specify characteristics relevant to one or more enterprises.

2. The system as claimed in claim 1, wherein each rule of the first set of data extraction rules specify a particular way of extracting data based on a manner in which information is presented in documents of multiple data formats.

3. The system as claimed in claim 1, wherein the predefined set of rules include specific rules to select and apply one or more cognitive computing techniques to read and extract data from documents of multiple data formats.

4. The system as claimed in claim 1, wherein the predefined set of rules includes the rule to automatically generate rules by learning a new manner in which information is presented in documents of multiple data formats.

5. The system as claimed in claim 1, wherein the data analytics and feedback unit generates the second set of data adaptation rules in the event it is determined that the extracted data does not correspond to a predetermined output, wherein the predetermined output is ascertained based on a predefined criteria stored in a knowledge base.

6. The system as claimed in claim 1, wherein the second set of data adaptation rules includes different rules that specify a particular way of adapting a corresponding rule of the first set of data extraction rules to adapt to documents with a particular way of presenting information.

7. The system as claimed in claim 1, wherein the second set of data adaptation rules includes different rules that specify a particular way of adapting a corresponding rule of the predefined set of rules to adapt to documents with a particular way of presenting information.

8. The system as claimed in claim 1, wherein the data analytics and feedback unit stores new data obtained by application of the second set of data adaptation as data elements in a term document matrix.

9. The system as claimed in claim 1, wherein the data generated by applying the data extraction rules and the data generated by applying the data adaptation rules is stored in a knowledge database as semantic data.

10. The system as claimed in claim 1, wherein the automatic decision unit generates the set of data optimization rules by identifying correspondence between each rule of the first set of data extraction rules and each rule of the data adaptation rules based on a feedback data stored in a repository.

11. The system as claimed in claim 1, wherein the automatic decision unit generates the set of data optimization rules by identifying correspondence between a specific rule of the predefined set of rules and each rule of the data adaptation rules based on a feedback data stored in a repository.

12. The system as claimed in claim 1, wherein the automatic decision unit 110 is configured to generate workflows on the basis of the metrics generated for each enterprise in relation to services and products offered by each enterprise.

13. A method for optimizing aggregation and analysis of data across multiple data sources of multiple enterprises, the method comprising:

generating a first set of data extraction rules by invoking an automatic rule generation rule, wherein the automatic rule generation rule is invoked in the event a predefined set of rules is determined to be not applicable for extracting data associated with the multiple data sources;

generating a second set of data adaptation rules in the event data extracted by applying at least one of: the first set of data extraction rules and the predefined set of rules does not correspond to a predetermined output, wherein the set of data adaptation rules specifies a particular way of adapting one or more rules from the first set of data extraction rules and/or one or more rules of the predefined set of rules;

encapsulating the second set of data adaptation rules in a feedback loop for transmission;

generating a set of data optimization rules based on the first set of data extraction rules and the second set of data adaptation rules, wherein the set of data optimization rules is generated by associating each data extraction rule from the set of data extraction rule and the predefined set of rules with a corresponding data adaptation rule; and generating one or more metrics based on the set of data optimization rules, wherein the one or more metrics specify characteristics relevant to one or more enterprises.

14. The method as claimed in claim 13, wherein each rule of the first set of data extraction rules specify a particular way of extracting data based on a manner in which information is presented in documents of multiple data formats.

15. The method as claimed in claim 13, wherein the predefined set of rules include specific rules to select and apply one or more cognitive computing techniques to read and extract data from documents of multiple data formats.

16. The method as claimed in claim 13, wherein the predefined set of rules includes the rule to automatically generate rules by learning a new manner in which information is presented in documents of multiple data formats.

17. The method as claimed in claim 13, wherein the method comprises generating the second set of data adaptation rules in the event it is determined that the extracted data does not correspond to a predetermined output, wherein the predetermined output is ascertained based on a predefined criteria stored in a knowledge base.

18. The method as claimed in claim 13, wherein the second set of data adaptation rules includes different rules that specify a particular way of adapting a corresponding rule of the first set of data extraction rules to adapt to documents with a particular way of presenting information.

19. The method as claimed in claim 13, wherein the second set of data adaptation rules includes different rules that specify a particular way of adapting a corresponding rule of the predefined set of rules to adapt to documents with a particular way of presenting information.

20. The method as claimed in claim 13, wherein the method comprises storing new data obtained by application of the second set of data adaptation as data elements in a term document matrix.

21. The method as claimed in claim 13, wherein the method comprises storing the data generated by applying the data extraction rules and the data generated by applying the data adaptation rules in a knowledge database as semantic data.

22. The method as claimed in claim 13, wherein method comprises generating the set of data optimization rules by identifying correspondence between each rule of the first set of data extraction rules and each rule of the data adaptation rules based on a feedback data stored in a repository.

23. The method as claimed in claim 13, wherein the method comprises generating the set of data optimization rules by identifying correspondence between a specific rule of the predefined set of rules and each rule of the data adaptation rules based on a feedback data stored in a repository.

24. The method as claimed in claim 13, wherein the method comprises generating workflows on the basis of the metrics generated for each enterprise in relation to services and products offered by each enterprise.

25. A computer program product comprising:
a non-transitory computer-readable medium having computer-readable program code stored thereon, the computer-readable program code comprising instructions that, when executed by a processor, causes the processor to:
generate a first set of data extraction rules by invoking an automatic rule generation rule, wherein the automatic rule generation rule is invoked in the event a predefined set of rules is determined to be not applicable for extracting data associated with the multiple data sources;
generate a second set of data adaptation rules in the event data extracted by applying at least one of: the first set of data extraction rules and the predefined set of rules does not correspond to a predetermined output, wherein the set of data adaptation rules specifies a particular way of adapting one or more rules from the first set of data extraction rules and/or one or more rules of the predefined set of rules, and encapsulate the second set of data adaptation rules in a feedback loop for transmitting to the data acquisition unit; and
generate a set of data optimization rules based on the first set of data extraction rules and the second set of data adaptation rules, wherein the set of data optimization rules is generated by associating each data extraction rule from the first set of data extraction rules and the predefined set of rules with a corresponding data adaptation rule, and generate one or more metrics based on the set of data optimization rules, wherein the one or more metrics specify characteristics relevant to one or more enterprises.

\* \* \* \* \*